UNITED STATES PATENT OFFICE.

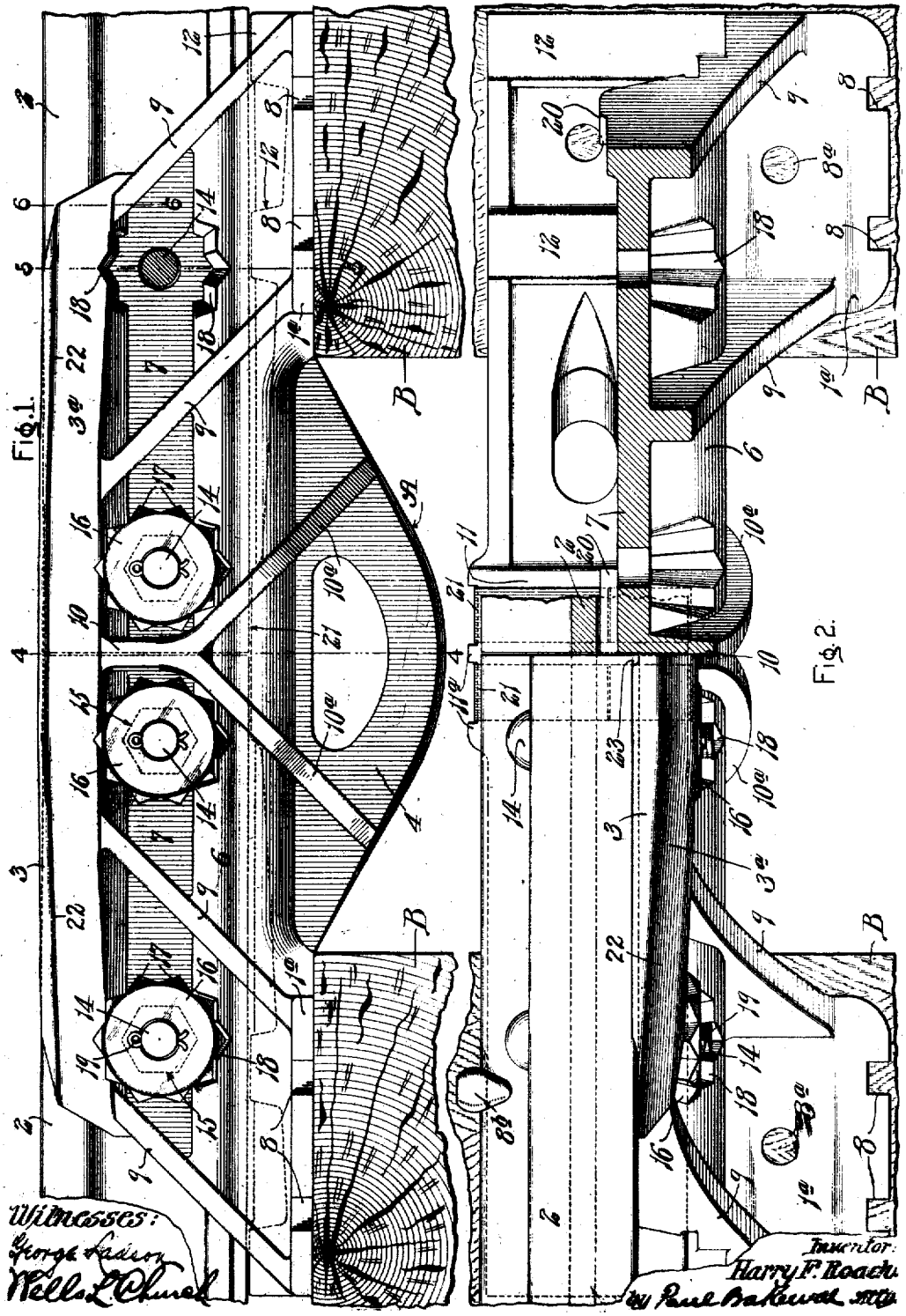

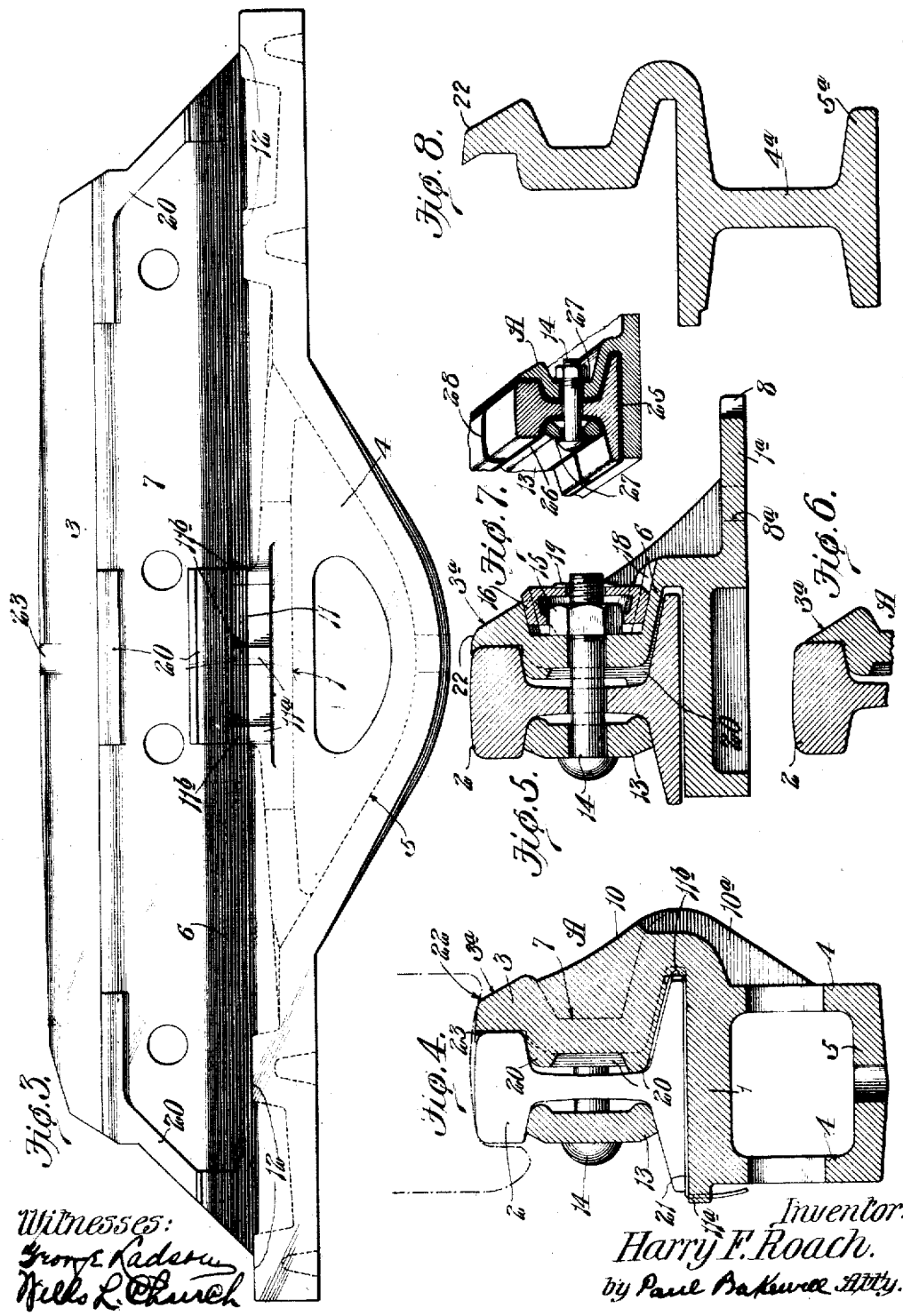

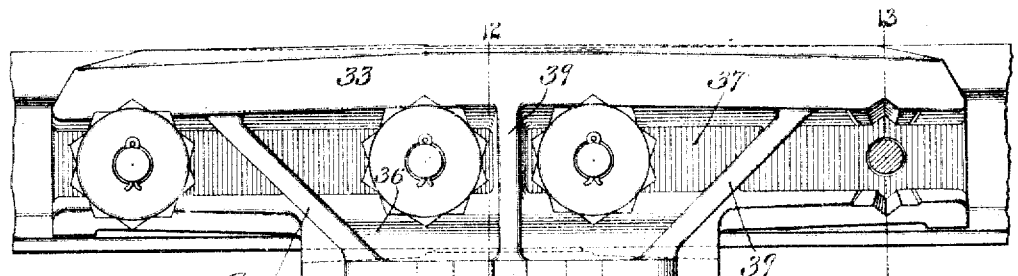
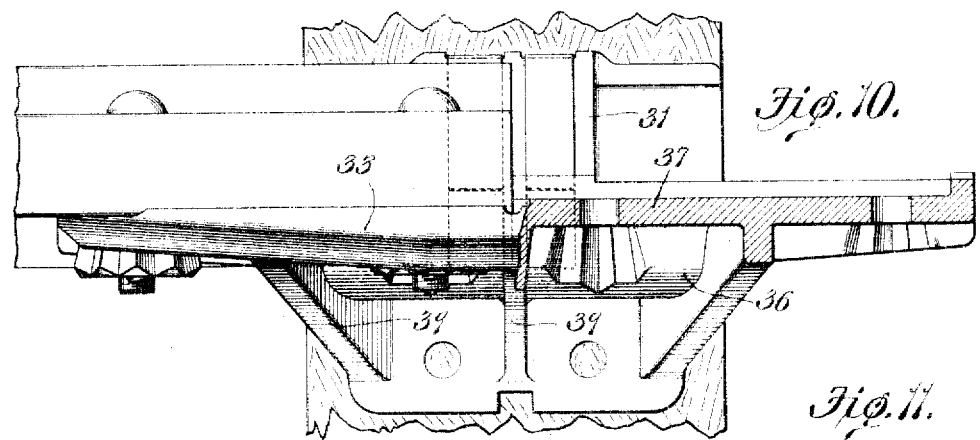
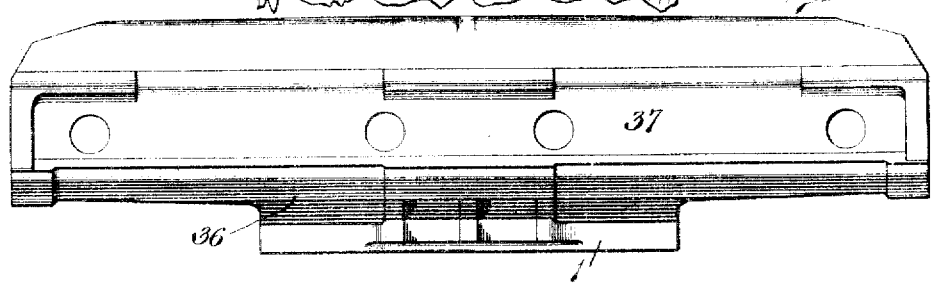
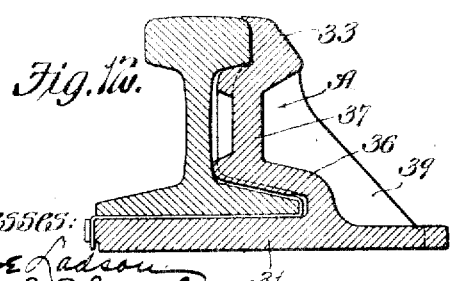
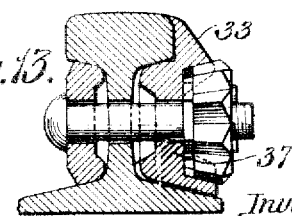

HARRY F. ROACH, OF ST. LOUIS, MISSOURI.

RAIL-JOINT.

954,590. Specification of Letters Patent. Patented Apr. 12, 1910.

Application filed March 5, 1909. Serial No. 481,370.

*To all whom it may concern:*

Be it known that I, HARRY F. ROACH, a citizen of the United States, residing at St. Louis, Missouri, have invented a certain new and useful Improvement in Rail-Joints, of which the following is a full, clear, and exact description, such as will enable others skilled in the art to which it appertains to make and use the same.

This invention relates to rail joints.

One object of my invention is to provide a rail-joint which is so designed that rails of greater length than those now in general use can be used successfully.

Another object is to provide a rail-joint that is as stiff vertically and laterally as the rail, thus producing a very efficient support for a wheel at the joint.

Another object is to provide a rail-joint which is so constructed that the nuts on the bolts that retain the rail joint members in position cannot be sheared off by the flange of a derailed wheel or by an element of the equipment of the car, said nuts also being protected in such a manner that oil or other liquids that drip from cars cannot come in contact with same.

Another object is to provide a rail-joint having the characteristics above-mentioned and also a rail-supporting base portion that has an extended bearing surface on the track ties.

Another object of my invention is to provide a rail-joint which is so constructed that the bolts which hold the splice members in position will not be subjected to longitudinal strains.

Another object is to provide a rail-joint having a member for carrying the wheels over the joint between the abutting rails, which member is so constructed that it will accommodate either perfect, flat, or "double-flanged" wheels without subjecting the rolling stock to excessive or perceptible perpendicular shocks or jars.

Another object is to provide a rail-joint having a wheel-tread member extending across the joint between the ends of the rails and being so designed that it will cause a double-flanged wheel to shift laterally in passing over the joint.

Another object is to provide a rail-joint that comprises a rail-embracing member which is provided with bearing surfaces that can be chipped off or cut away easily when said member is being installed so as to secure a perfect fit between said member and the rails and thus produce a stiff and rigid rail-joint.

Another object is to provide a substantial and strong rail-joint that comprises members which are so constructed that they will hold insulating material securely in position and thus perfectly insulate the rail from the means that connects the rails together.

Other objects and desirable features of my invention will be hereinafter pointed out.

Figure 1 of the drawings is a side elevational view of a suspended rail-joint embodying my invention; Fig. 2 is a top plan view, partly in horizontal section, of the members shown in Fig. 1; Fig. 3 is a side elevational view of the member that supports the rails and carries the wheels over the joint between the rails; Fig. 4 is a vertical sectional view taken on the line 4—4 of Fig. 1; Fig. 5 is a vertical sectional view taken on the line 5—5 of Fig. 1; Fig. 6 is a vertical sectional view taken on the line 6—6 of Fig. 1; Fig. 7 is a perspective view of my improved rail-joint embodied in a construction in which the rails are insulated from the means that connects them together; Fig. 8 is a cross sectional view of a slightly modified form of my invention; Fig. 9 is a side elevational view of a supported rail-joint embodying my invention; Fig. 10 is a top plan view, partly in horizontal section, of the parts shown in Fig. 9; Fig. 11 is a side elevational view of the rail-supporting and embracing member shown in Fig. 10; Fig. 12 is a vertical sectional view taken on the line 12—12 of Fig. 9; and Fig. 13 is a vertical sectional view taken on the line 13—13 of Fig. 9.

Referring to Figs. 1 to 5 of the drawings which illustrate my invention embodied in a suspended rail-joint, A designates a metal member that comprises a support or base portion 1 on which the base flanges of the abutting rails 2 rest, said member A also comprising a wheel-tread portion 3 that extends longitudinally of the rails along the outside of the heads of said rails. I prefer to build the base or supporting portion 1 of the member A in the form of a girder so as to impart great strength thereto, and in the form of my invention shown in Figs. 1 and 4 the support 1 is provided on its under side with integral depending tapered flanges 4 that are connected together by an integral cross web 5 whose ends merge into the base portion 1, as shown in dotted lines in Fig. 3, thus forming a box-girder which is of greatest depth at its central portion. I also prefer to camber the base 1 slightly so as to impart additional strength thereto. The end portions 1ª of the base or support 1 rest on the two track ties B which are located at each side of the joint between the ends of the rails, and the box-girder portion of said support lies between the two ties, as shown in Figs. 1 and 3.

Instead of providing the base 1 with a box-girder portion said base can be provided with a single depending flange 4ª that forms the vertical web of an approximately I-shaped beam whose tension member 5ª is connected to the compression member 1 of the beam, as shown in Fig. 8. In fact, the base portion of the member A can be reinforced and strengthened in various ways and while I have herein shown two different ways of reinforcing the base I do not wish it to be understood that my broad idea is limited to these exact constructions. Nor do I wish it to be understood that my broad idea is limited to a construction in which the supporting portion 1 of the member A is trussed or reinforced by flanges or other devices as above referred to for, if desired, the base 1 could consist of a flat plate of sufficient strength to stand the strains to which it would be subjected when in service.

The base or support 1 is provided at one edge with an integral portion 6 that laps over part of the base flange of each rail, and said overlapping portion 6 is connected to the wheel-tread portion 3 by means of a vertical web 7 that is formed integral with said parts, said web having surfaces that bear against one side of the vertical webs of the rails. The wheel-tread portion 3 bears against the outside faces of the heads of the rails, and as said wheel-tread portion extends across the joint between the ends of the rails, it reinforces the ends of the rails and forms a bearing for an imperfect or double-flanged wheel in passing over the joint. The end portions 1ª of the base are of greater width than the central portion of the base so that said end portions will have an extended bearing surface on the ties, said end portions being provided with notches 8, as shown in Fig. 2, for receiving the spikes or fastening devices that retain the member A in position. If desired, the end portions 1ª of the base can also be provided with auxiliary holes 8ª for receiving fastening devices so that if the member A is taken up or removed and then replaced in its former position the fastening devices can be driven into the ties at different points instead of being driven into the holes that aline with the notches 8.

Inclined ribs 9 are arranged at each end of the member A, as shown in Figs. 1 and 2, to reinforce the wheel-tread portion 3 and also transmit the strains which said wheel-tread portion is subjected to directly to the end portions 1ª of the base which rest upon the ties, the pair of ribs 9 at one end of the member A being inclined oppositely to the pair of ribs at the other end of said member and both sets of ribs being formed integral with the tread portion 3, with the vertical web 7, the overlapping portion 6, and the base 1 of the member A so as to brace said member A against lateral strains. At approximately the center of the member A is a vertical rib 10 which merges into two diverging branches 10ª or oppositely inclined ribs that are connected to one side of the box girder on the under side of the base 1 so as to transmit the strains to which the wheel-tread portion is subjected directly to the reinforcing means of the base and also take care of any other forces that may come on the rail-joint either at the wheel-tread portion or on the base. The vertical rib 10 and the branches thereof, are, of course, formed integral with the various parts of the member A. The inclined ribs 9 flare outwardly from their upper ends toward their lower ends, and as the end portions 1ª of the base project laterally some distance from the track rails, the member A will take up the side thrusts to which the track rails are subjected as well as preventing the rails from being deflected downwardly under vertical loads.

Instead of having the base flanges of the rails bear upon the entire length of the base 1 of the member A I prefer to provide the central portion of said base with a bearing surface 11, and the ends of said base with bearing ribs 12.

The member A is arranged on one side of the rails, and a fish plate or splice bar 13 of any preferred construction is arranged on the opposite side of the rails, said member and splice bar being retained in operative position by means of bolts 14 that pass through said parts and through holes in the vertical webs of the rails, the shanks of said bolts being so designed that they cannot turn or rotate. I have herein shown a splice bar 13 that bears against the base flanges and the under side of the heads of the rails but I do not wish it to be understood that it is necessary to use such a splice bar for a narrow splice bar could be used with equally good results. The nuts 15 which are mounted on said bolts can be locked by any suitable means but I prefer to use locking caps 16, as shown in Figs. 1, 2 and 5. These locking caps 16 fit over the nuts 15 and are provided on their peripheral edges with a plurality of spurs or teeth 17 that coöperate with shoulders 18 on the outside face of the member A so as to prevent the caps from turning and thus lock the nuts or prevent them from turning on the bolts. The edges of said caps are inclined so that they will wedge between the under side of the tread portion 3 of the member A and the upper side of the overlapping portion 6 of said member when said caps are driven inwardly, the caps being provided with holes through which the ends of the bolts project. After the caps have been positioned upon the nuts cotter keys 19 are inserted in the bolts to prevent the caps from moving outwardly. In view of the fact that the caps are provided with a plurality of spurs or projections 17, and the member A is provided with a plurality of coöperating shoulders or notches 18, the nuts can always be adjusted in a position to cause the projections on the caps to engage the coöperating shoulders on the member A.

I prefer to use nut-locking devices of the construction above described but it will, of course, be obvious that various other types of nut locks could be used in my rail-joint without departing from the spirit of my invention.

The member A bears against one side of the rails and thus braces them against lateral movement in one direction, and as the base flanges on the other side of the rails are engaged by spikes 8b that are driven into the track ties, the rails could not move laterally in either direction even if the bolts should become displaced.

I prefer to provide the inner face of the member A with bearing ribs 20, as shown in Fig. 3, that can be chipped off or cut away slightly in case the rails do not fit snugly inside of said member, said ribs being adapted to bear against the vertical webs of the rails. Fillers or shims 21 consisting of thin strips of metal, can also be inserted between the base flanges of the rails and the base 1 and overlapping portion 6 of the member A to secure a tight fit between the said member and rails. This also makes it possible for different heights of rails to be fitted in the same space by shims. When I say "different heights" I mean a slight difference of the same supposed standard height occasioned by an error in manufacture on the part of the manufacturer of the rolled steel rails and also on account of an error in the manufacture of the casting. After the shims 21 have been arranged in position they can be bent downwardly between lugs 11 that project laterally beyond the edge of the base 1, thus locking said shims in position. The inner face of the member A is also provided with guide lugs 11b at the point where the overlapping portion 6 is connected to the base so as to prevent the shims from being displaced laterally.

The tread portion 3 of the member A is so formed that it will permit a perfect, flat, or double-flanged wheel to pass over the joint without subjecting the rolling stock to a perceptible perpendicular shock or jar, the term "double-flanged" being used to designate a wheel whose tread surface has become worn to such a degree that it is approximately concaved or channel-shaped in cross section, as shown in broken lines in Fig. 4. This feature of my invention is illustrated clearly in Figs. 2, 4, 5 and 6, and referring to said figures it will be seen that the top face or wheel-tread surface of the member 3 is of greatest width adjacent the joint between the rails and thence diminishes gradually in width toward its opposite ends, so as to produce an inclined surface or edge 22 at the conjunction of the wheel-tread surface and the side face 3a of the member 3, said side face being preferably inclined downwardly.

As shown clearly in Figs. 1 and 2, the wheel-tread surface of the member 3 varies gradually from an approximately horizontal plane at the center of said member to an inclined plane at the ends of said member, thus producing a wheel-tread surface of varying angularity. In other words, the wheel-tread surface of the member 3 twists gradually from an inclined surface at each end of said member into an approximately horizontal surface at the center of said member, so that when a double-flanged wheel reaches the member 3 it will pass onto same without a perceptible vertical shock or jar and be shifted laterally by the gradual variation in the shape of the wheel-tread surface of the member 3. It will thus be seen that the wheel-tread surface of the member 3 not only forms a substantial supporting surface for a wheel while it is passing over the joint, but said wheel-tread surface also acts as a guide to cause a double-flanged wheel to be gradually shifted laterally. Another advantage in forming the wheel-tread surface of the member 3 in this manner is that the ends of the inclined corner 22 commence in a lower horizontal plane than the treads of the rails, so that the heads of the rails can wear down without affecting the efficiency of the member 3 as a guiding agent for shifting a double-flanged wheel laterally. Still another advantage of such a construction is that it has a tendency to cut down or wear away the outer flange of a double-flanged wheel owing to the fact that said outer flange hugs the inclined portions of the wheel-tread surface of the member 3 so closely that the friction tends to wear said flange away. The inclined corner or edge 22 on the member 3 diverges from the rail, as shown in Fig. 2, and when an abnormally flanged or guttered wheel approaches the joint the outer flange of the wheel will contact with the corner 22 and thus cause the wheel to gradually shift laterally as it travels over the joint.

The wheel-tread portion 3 conforms to the side face of the rail heads so that a wide joint will not be formed between said parts, and the part of said wheel-tread portion that laps over the rail heads is notched out at 23 adjacent the joint between the rails so that the metal in said wheel-tread portion will not be jammed into said joint and thus prevent the rails from expanding. The metal at the rear of the notch is raised slightly so as to provide a raised bearing surface for the wheel and thus prevent it from jumping when it passes over the notch.

From the foregoing it will be seen that my improved rail joint member A provides a bearing surface for a wheel as it passes over the joint betwen two abutting rails and thus prevents the wheel from hammering the ends of the rails. It also accommodates either perfect, flat, or imperfect wheels and gradually shifts an imperfect wheel laterally so that the tread thereof will bear upon a wide bearing surface that extends across the joint. Consequently, my improved rail-joint makes it possible to successfully use very long rails, such, for example, as sixty-foot rails, for the terminals of said rails can be spaced far enough apart to provide for the excessive expansion and contraction of rails of this length, owing to the fact that the wheel is carried over the joint by a wheel-tread member which is so designed that it will accommodate either perfect, flat, or double-flanged wheels. It provides a rigid support for the base flanges of the rails and transmits the load to said support by other means than the rails, thereby reducing the strains on the rails and producing practically a continuous rail for the joint is stiff vertically and also laterally. It also eliminates longitudinal strains on the bolts that retain the splice members in position for the pressure of the wheel on the wheel-tread portion 3 tends to force said portion, and also the web 7 and overlapping portion 6 of the member A, inwardly toward the longitudinal center of the rails. That is to say, in my improved construction the rails rest on a solid base or support 1 which has a wheel-tread portion 3 connected to one edge thereof by the overlapping portion 6 and the vertical web 7 so that any downward thrust or load on said wheel-tread portion will tend to force it tightly against the rails because the overlapping portion 6 is integrally connected to the outer edge of the base at a point outside of the downward thrust on the wheel-tread portion.

Still another desirable feature of my improved construction is that the wheel-tread portion of the member A projects laterally over the nuts on the bolts and thus protects said nuts from oil and other liquids that drip from cars and which would have an injurious effect on the nuts. This laterally projecting portion 3 on the member A also prevents a derailed wheel or an element of the equipment of the car from coming in contact with the nuts and shearing them off the bolts.

Another very desirable feature of my construction is that it enables the rails to be perfectly insulated from the rail-joint members and still produces a rail-joint that is much stronger and more substantial than those that have heretofore been in use. Referring to Fig. 7 which illustrates this feature of my invention, 25 designates a piece of insulating material that is molded so as to conform to the inner face of the member A, and 26 designates a piece of insulating material that is interposed between the rails and the fish plate 13, the piece of insulating material 25 preferably projecting slightly above the upper edge of the member A, as shown in Fig. 7, so that the wheel will not bear upon or contact with the member A. It is not absolutely necessary, however, that the insulating material should project above the upper edge of the member A for a wheel could bear upon one of the rails and also on the member A without bringing the other rail into circuit owing to the fact that a piece of insulating material is interposed between the ends of the two rails. The bolts 14 and also the heads and nuts of said bolts are insulated from the fish plate and from the member A by insulating sleeves 27 provided with flanges against which the heads and the nuts of the bolts bear, and a piece of insulating material 28 can be interposed between the abutting ends of the rails. After the parts have been arranged in position and the nuts on the bolts tightened it will be impossible for any of the insulating material to work loose or become displaced.

In Figs. 9 to 13, inclusive, I have shown my invention embodied in a supported rail-joint; namely, a joint in which a track tie B is located underneath the terminals of the abutting rails. In this form the member A is provided with a base 31 that is connected to the tie by suitable fastening devices, the vertical web 37 of said member and the rail flange bearing portion 36 projecting laterally from each side of the base longitudinally of the rails, as shown in Figs. 9, 10 and 11. The wheel-tread portion 33 is of substantially the same construction as that shown in the suspended rail-joint, and ribs 39 are provided for transmitting the strains which said wheel-tread portion receives directly to the base and also for bracing the vertical web. The bearing ribs, shims, and nut-retaining means shown in this form are substantially the same as those previously described so that a detailed description of same is not necessary.

Having thus described my invention, what I claim as new and desire to secure by Letters Patent is:

1. In a rail-joint, a wheel-tread member arranged adjacent the joint between the ends of the rails and provided with means for causing a perfect or an imperfect wheel to travel across the joint between the ends of the rails without subjecting the wheel to a perceptible or excessive shock or jar, a rail support to which said member is connected, and braces connected to said member and support for resisting the lateral and downward stresses which said wheel-tread member is subjected to.

2. In a rail-joint, a wheel-tread member arranged outside of the rails adjacent the joint between the ends of the rails and provided with means for causing a perfect or an imperfect wheel to travel across the joint between the ends of the rails without subjecting the wheel to a perceptible or excessive shock or jar, a rail support to which said member is connected, and braces integrally connected to said member and support for resisting the lateral and downward stresses which said wheel-tread member is subjected to.

3. A rail-joint provided with a wheel-tread member arranged outside of the rails adjacent the joint between the ends of the rails and having means for causing an imperfect or double-flanged wheel to pass from the track rails onto said member without a perceptible shock or jar and then shift laterally in traveling over said member so as to maintain the outer flange of the wheel in such a position that it will not cause the main portion of the tread of the wheel to be lifted or raised from said member.

4. A rail-joint comprising a support for the rails, a vertically disposed web connected to said support, and a wheel-tread member on said web arranged on the outer sides of the rails and provided with means for causing an imperfect or double-flanged wheel to pass from the track rails onto said member without a perceptibl shock or jar and then shift laterally in traveling over said member so as to maintain the outer flange of the wheel in such a position that it will not cause the main portion of the tread of the wheel to be lifted or raised from said member.

5. A rail-joint comprising a support for the rails, a vertically disposed web connected to said support, a wheel-tread member on said web arranged on the outer sides of the rails and provided with means for causing an imperfect or double-flanged wheel to shift laterally in passing over the joint between the ends of the rails, and means independent of said web for resisting the lateral and downward stresses which said wheel-tread member is subjected to.

6. A rail-joint comprising a support for the rails, a portion connected to said support for overlapping portions of the base flanges of the rails, a vertically disposed web connected to said overlapping portion, a wheel-tread member on said web arranged outside of the heads of the rails and provided with means for causing a perfect or imperfect wheel to travel across the joint between the ends of the rails without receiving a perceptible vertical shock or jar, and oppositely inclined ribs on the outer side of said web that have their upper ends projecting toward each other and their lower ends flared outwardly from said web.

7. In a rail-joint, a base or support, raised bearings on said support on which the terminals of the rails normally rest, independent bearings on said support which are normally spaced away from the base flanges of the rails, and a splice member connected to said support and provided with means for causing an imperfect or double-flanged wheel to shift laterally in passing over the joint between the ends of the rails.

8. In a rail-joint, a wheel-tread member arranged outside of the heads of the rails adjacent the joint between the ends of the rails and provided with a twisting wheel-tread surface that permits an imperfect or double-flanged wheel to travel across the joint without receiving a perceptible vertical shock or jar.

9. In a rail-joint, a wheel-tread member arranged outside of the heads of the rails adjacent the joint between the ends of the rails, and provided with a wheel-tread surface that changes gradually from an inclined surface at one end of said member into an approximately horizontal surface adjacent the middle of said member.

10. A rail-joint provided with a wheel-tread member having a twisting wheel-tread surface that diminishes gradually in width throughout one-half the length of said member.

11. In a rail-joint, a wheel-tread member having a twisting wheel-tread surface which acts both as a supporting surface for a wheel and also as a guide to cause a double-flanged wheel to shift laterally in passing over the joint.

12. A rail-joint provided with a wheel-tread member arranged outside of the heads of the rails adjacent the joint between the ends of the rails, said member having a wheel-tread surface that commences in an approximately vertical plane and twists gradually into an approximately horizontal plane so as to cause an imperfect or double-flanged wheel to shift laterally in passing over the joint.

13. In a rail-joint, a splice member provided with a head that diminishes gradually in width from its center toward its opposite ends, said head having a wheel-tread surface that twists gradually from an inclined plane at the ends of said member into an approximately horizontal plane at the center of said member.

14. In a rail-joint, a splice member provided with a head that diminishes gradually in width from its center toward its opposite ends, said head having a wheel-tread surface that twists gradually from an inclined plane at the ends of said member into an approximately horizontal plane at the center of said member, a base carrying said splice member and provided with laterally projecting portions that are adapted to rest upon the ties of the track, and oppositely inclined braces on said splice member having their upper ends projecting toward each other and their lower ends connected to the laterally projecting portions of the base.

15. In a rail-joint, abutting T-rails, and a splice member having a wheel-tread portion that conforms to the side faces of said rails and laps partially over the tread-faces of said rails, the overlapping part of said wheel-tread portion being provided with a notch or cut-out portion which is located at the joint between the end of the rails.

16. In a rail-joint, abutting rails, splice members arranged on opposite sides of said rails, a wheel-tread portion on one of said members provided with a twisting wheel-tread surface that causes a double-flanged wheel to shift laterally in passing over the joint, and insulating material interposed between said rails and splice members.

17. In a rail-joint, a base on which the rails rest, an integral web on said base that extends longitudinally of the rails, and oppositely inclined ribs on the outer side of said web that have their upper ends projecting toward the joint between the ends of the rail and their lower ends flared outwardly and connected to the base so as to reinforce and strengthen said web and resist the lateral stresses to which it is subjected.

18. In a rail-joint, a base provided with an integral portion that partially laps over the base flanges of the rails that rest upon said base, a vertical web on said overlapping portion that extends longitudinally of the rails, and oppositely inclined ribs integrally connected to said web and base and having their upper ends projecting toward each other and their lower ends flared outwardly and connected to the base.

19. In a rail-joint, a base that forms the tension member of a girder, a vertical web connected to a portion of said base that partially laps over the flanges of the rails which rest upon the base, a compression member extending along the upper edge of said web, and oppositely inclined ribs interposed between said tension and compression member and having their upper ends projecting toward each other and their outer ends flared outwardly away from said web.

20. In a rail-joint, a base for supporting abutting rails, a portion connected to said base for overlapping the flanges of the rails, a vertical web connected to said overlapping portion and provided at its upper edge with a wheel-tread member that extends across the joint between the ends of the rails, said wheel-tread portion having an inclined surface that is adapted to be engaged by the outer flange of a double-flanged wheel and thus cause such a wheel to shift laterally in passing over the joint, and ribs extending from said wheel-tread portion to said base for strengthening and bracing said wheel-tread portion so as to take up the side thrusts to which the rails are subjected.

21. In a rail-joint, a rail, a member provided with a base on which the rail rests and portions that overlap the base flange of the rail and bear against the vertical web thereof, bearing ribs on said member that can be chipped off so as to secure a tight fit between said member and rail, and removable devices interposed between said member and rail for forcing said parts into intimate engagement with each other.

22. In a rail-joint, a cast member provided with a trussed base on which the abutting track rails rest, a wheel-tread portion on said member that extends across the joint between the ends of the rails, and inclined ribs for transmitting the strains which said wheel-tread portion receives to the trussed portion of said base.

23. A rail-joint provided with a trussed base and with a wheel-tread portion that is connected to one edge of said base, and ribs extending from the wheel-tread portion to the truss of the base for reinforcing and strengthening said wheel-tread portion.

In testimony whereof I hereunto affix my signature in the presence of two witnesses, this first day of March 1909.

HARRY F. ROACH.

Witnesses:
WELLS L. CHURCH,
GEORGE BAKEWELL.